US007500009B2

(12) United States Patent
Cohen et al.

(10) Patent No.: US 7,500,009 B2
(45) Date of Patent: Mar. 3, 2009

(54) RATE COMPUTATIONS OF PARTICULAR USE IN SCHEDULING ACTIVITIES OR ITEMS SUCH AS THE SENDING OF PACKETS

(75) Inventors: Earl T. Cohen, Fremont, CA (US); Christopher J. Kappler, Waltham, MA (US)

(73) Assignee: Cisco Technology, Inc., San Jose, CA (US)

(*) Notice: Subject to any disclaimer, the term of this patent is extended or adjusted under 35 U.S.C. 154(b) by 971 days.

(21) Appl. No.: 10/777,607

(22) Filed: Feb. 11, 2004

(65) Prior Publication Data

US 2005/0198342 A1    Sep. 8, 2005

(51) Int. Cl.
 *G06F 15/16* (2006.01)
(52) U.S. Cl. .................. 709/233; 709/232; 709/234; 709/235; 370/229; 370/232; 370/233; 370/234; 370/235
(58) Field of Classification Search ......... 709/231–235; 370/229–235
See application file for complete search history.

(56) References Cited

U.S. PATENT DOCUMENTS

| | | | | |
|---|---|---|---|---|
| 5,748,614 | A | * | 5/1998 | Wallmeier .............. 370/395.41 |
| 5,883,895 | A | * | 3/1999 | Davis et al. ................... 370/462 |
| 6,438,106 | B1 | * | 8/2002 | Pillar et al. .................. 370/232 |
| 7,161,902 | B2 | * | 1/2007 | Carter et al. ................ 370/229 |
| 2005/0063388 | A1 | | 3/2005 | Stacey et al. |
| 2005/0220114 | A1 | | 10/2005 | Romano et al. |

OTHER PUBLICATIONS

Camrass et al., "Encoding Message Lengths for Data Transmission," IEEE Transactions of Information Theory, vol. IT-24, No. 4, Jul. 1978.
Alan Huang, "An Optical Residue Arithmetic Unit, International Conference on Computer Architecture," Proceedings of the 5th Annual Symposium on Computer Architecture, pp. 17-23, ACM Press, 1978.
Witten et al., "Arithmetic Coding for Data Compression," Communications of the ACM, vol. 30, Issue 6, pp. 520-540, ACM Press, Jun. 1987.
Jean-Yves Le Boudec, "Some Properties of Variable Length Packet Shapers," IEEE/ACM Transactions on Networking, vol. 10, No. 3, Jun. 2002.

* cited by examiner

*Primary Examiner*—Nathan J Flynn
*Assistant Examiner*—Mohammad A Siddiqi
(74) *Attorney, Agent, or Firm*—The Law Office of Kirk D. Williams

(57) ABSTRACT

Rate computations are performed such as for use in scheduling activities, such as, but not limited to packets, processes, traffic flow, etc. One implementation identifies an approximated inverse rate, a fix-up adjustment value, and a quantum. An activity measurement value is maintained based on a measure of activity, and a rate control value is maintained based on the measure of activity and the approximated inverse rate. The fix-up adjustment value is applied once each quantum to the rate control value to maintain rate accuracy of the activity. In one implementation, the control value is a scheduling value used for determining when to perform a next part of the activity (e.g., send one or more packets). Scheduling rates are efficiently and compactly stored in an inverse form, which may have advantages in terms of rate granularity, accuracy, and the ability to deliver service smoothly.

25 Claims, 9 Drawing Sheets

**STORED VALUES

PSEUDO-CODE
180

```
// Reset slot to the bytes_sent==0 point
old_offset = inv_rate * bytes_sent;
slot = slot - int(old_offset);

bytes_sent = bytes_sent + n;

if(bytes_sent >= quantum) {
    interval = inv_rate*quantum + fix_up;
    slot = slot + int(interval);
    // optional step to dither based on LSBs of interval --
    // requires interval to have have fractional bits
    slot = slot + random_dither(frac(interval));
    bytes_sent = bytes_sent - quantum;
    // fall-through to handle left-over part
}

// Account for new bytes
new_offset = inv_rate * bytes_sent;
slot = slot + int(new_offset);
```

FIGURE 1D

**RELATIVELY STATIC STORED
VALUES FOR RATE COMPUTATION

| TARGET RATE (%) | ACTUAL RATE (%) | INTERVAL | QUANTUM BYTES | SLOTS / BYTE | APPROX. INVERSE RATE | FIX-UP ADJUSTMENT VALUE |
|---|---|---|---|---|---|---|
| 640 | 640.00689 | 1.020000 | 65280 | 0.0000156 | $131/256 * 2^{-15}$ | $18/256 * 2^{-7}$ |
| 300 | 300.00330 | 1.092267 | 32768 | 0.0000333 | $139/256 * 2^{-14}$ | $207/256 * 2^{-7}$ |
| 200 | 200.00034 | 1.638400 | 32768 | 0.0000500 | $209/256 * 2^{-14}$ | $183/256 * 2^{-7}$ |
| 100 | 100.00017 | 1.638400 | 16384 | 0.0001000 | $209/256 * 2^{-13}$ | $183/256 * 2^{-7}$ |
| 90 | 90.00005 | 1.820444 | 16384 | 0.0001111 | $233/256 * 2^{-13}$ | $4/256 * 2^{-7}$ |
| 75 | 75.00083 | 2.184533 | 16384 | 0.0001333 | $139/256 * 2^{-12}$ | $207/256 * 2^{-6}$ |
| 50 | 50.00009 | 3.276800 | 16384 | 0.0002000 | $209/256 * 2^{-12}$ | $183/256 * 2^{-6}$ |
| 25 | 25.00004 | 6.553600 | 16384 | 0.0004000 | $209/256 * 2^{-11}$ | $183/256 * 2^{-5}$ |
| 10 | 10.00013 | 16.384000 | 16384 | 0.0010000 | $131/256 * 2^{-9}$ | $18/256 * 2^{-3}$ |
| 1 | 1.00000 | 163.840000 | 16384 | 0.0100000 | $163/256 * 2^{-6}$ | $215/256 * 2^{0}$ |
| 0.1 | 0.10000 | 1638.400000 | 16384 | 0.1000000 | $204/256 * 2^{-3}$ | $205/256 * 2^{3}$ |
| 0.012207 | 0.0122069 | 8192.000000 | 10000 | 0.8192000 | $209/256 * 2^{0}$ | $112/256 * 2^{6}$ |

EXAMPLES OF RATE ENCODING
(10KB MTU, 8192 SLOTS)
FIGURE 3B

RATE COMPUTATIONS OF PARTICULAR USE IN SCHEDULING ACTIVITIES OR ITEMS SUCH AS THE SENDING OF PACKETS

TECHNICAL FIELD

One embodiment of the invention relates to communications and computer systems, especially networked routers, packet switching systems, and other devices; and more particularly, one embodiment relates to rate computations for metering the rate at which things occur, which may be of particular use in scheduling packets.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet. For example, an enqueuing component of such a device receives a stream of various sized packets which are accumulated in an input buffer. Each packet is analyzed, and an appropriate amount of memory space is allocated to store the packet. The packet is stored in memory, while certain attributes (e.g., destination information and other information typically derived from a packet header or other source) are maintained in separate memory. Once the entire packet is written into memory, the packet becomes eligible for processing, and an indicator of the packet is typically placed in an appropriate destination queue for being serviced according to some scheduling methodology.

Certain packet types and classifications of packet traffic must be sent at certain rates for reasons such as the nature of the traffic or a rate level guaranteed by a service provider, wherein the term "rate" as used herein typically refers to real-time rate and/or the resultant effect of any weighted service policy, such as, but not limited to virtual time weights, tokens, credits, events, etc. Thus, a scheduling system must deliver service at a specified rate to a queue containing packets of varying sizes. Furthermore, the rate delivery system must be able to support both real-time rate delivery (e.g., a fixed number of bytes per second), and virtual time rate delivery (e.g., a weighted fraction of the total available bandwidth). Rates must be encoded and stored, and computed and tracked in a fashion that is easily interpreted by hardware and/or software. For calendar-based schedulers, this rate is normally encoded as a quantum (i.e., a number of bytes) served in an interval (i.e., a number of calendar slots).

Quantum/interval encoding has several problems, including variable rate accuracy and a burstiness property. At the fast end of the range, the accuracy is n bytes (i.e., the quantum) in one interval, as the rate can only be changed by varying the number of bytes sent, and hence the accuracy is related to the maximum transmission unit (MTU). Thus, a ten thousand byte MTU would offer one part in ten thousand, but a fifteen hundred byte MTU (e.g., that used in Ethernet) would only offer one part in fifteen hundred. The quantum/interval scheme does not deliver rates smoothly. For example, with a ten thousand byte quantum, a queue sending forty byte packets might need to burst two hundred fifty packets before it was rescheduled. If its interval was greater than one, it would be preferable to reschedule it in intermediate steps as it sent each packet, rather than after all two hundred fifty packets are sent.

Most known systems have used some variant of the quantum/interval approach, where on each service of some fixed quantum of bytes, the calendar is advanced by a certain interval. Generally, these systems have either used large quantums more than the size of an MTU, or they have had to employ other techniques to deal with quantums that are less than an MTU. Larger quantums avoid complexities in the implementation, but the trade-off is much more burstiness.

Some systems have mitigated the burstiness problem by using a quantum that is smaller than an MTU. However, because packets then can be much larger than one quantum, a division operation (i.e., size/quantum) is required to compute the number of calendar slots to be moved. While this improves smoothness of rate delivery, it does so only at a trade-off in accuracy as the use of smaller quantums to deliver rates exacerbates the variable rate accuracy issue. Also, division is typically a very expensive operation. If a hardware divide capability is not available (as on many embedded software platforms), either the quantum must be restricted to a power of two which results in rate granularity problems, or the division must be done iteratively in which case rate computation does not operate in a fixed time). Moreover, using a hardware implemented divide operation could also introduce issues with "drift"/round-off errors which cause some of the desired rate to be lost. Accordingly, prior systems can offer granularity, but trade off smoothness against accuracy. Further, the need to create quantum/interval pairs to encode rates and the constraints on the creation of those pairs, can make it difficult to configure such systems. In particular, systems which use a power-of-two-only quantum may require iterative procedures to define sets of rates that best meet their individual criteria, and their relationship to each other.

SUMMARY

Disclosed are, inter alia, methods, apparatus, data structures, computer-readable medium, mechanisms, and means for performing rate computations, which may be used in most anything that meters the flow at which things happen. As such, these rate computations may be particularly useful in scheduling activities or items, such as, but not limited to packets (especially a series of related packets), processes, threads, traffic flow of any nature, etc.

One embodiment identifies an approximated inverse rate, a fix-up adjustment value, and a quantum. An activity measurement value is maintained based on a measure of activity, and a rate control value is maintained based on the measure of activity and the approximated inverse rate. The fix-up adjustment value is applied once each quantum to the rate control value to maintain rate accuracy of the activity. In one embodiment, the control value is a scheduling value used for determining the relative ordering or timing for performing a next part of the activity (e.g., send one or more packets). Scheduling rates are efficiently and compactly stored in an inverse form, which may have advantages in terms of rate granularity, accuracy, and the ability to deliver service smoothly. In one embodiment, applying the fix-up adjustment value once each quantum to the rate control value includes dithering the rate control value to either round-up or not to round-up the rate control value based on a random number One embodiment associates with a scheduling flow, such as a series of packets, a current slot, a scheduling item corresponding to a packet, and an approximated inverse rate, a fix-up adjustment value, and a quantum value. A last adjusted slot corresponding to the scheduling item is identified. A bytes sent value is adjusted based on a number of bytes of the packet to identify a new bytes sent value. In response to identifying that the bytes sent value is greater than or equal to a quantum value corresponding to the scheduling item: (a) a new last adjusted slot for the scheduling item is identified, which typically includes summing a product of the approximated inverse rate and the quantum value, the fix-up adjustment value, and the last adjusted slot; and (b) a next slot for the scheduling item is determined, which typically includes adding the product of the approximated inverse rate and the new bytes sent value to the new last adjusted slot.

In one embodiment, identifying the last adjusted slot for the scheduling item includes subtracting the product of the approximated inverse rate and the bytes sent value from the current slot. In one embodiment, the fix-up adjustment value is determined based on the error induced by the approximated inverse rate during a quantum corresponding to the scheduling item. In one embodiment, in response to identifying that the bytes sent value is less than a quantum value corresponding to the scheduling item, the next slot is determined, which typically includes adding the product of the approximated inverse rate and the new bytes sent value to the last adjusted slot. In one embodiment, identifying the new last adjusted slot for the scheduling item includes dithering the new last adjusted slot to either round-up or not to round-up the new last adjusted slot based on a random number.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 1D illustrates pseudo-code of a process for performing rate computations used in one embodiment;

FIG. 3B illustrates an exemplary resultant set of approximated inverse rates, fix-up adjustment values, and a quantum values for various target rates used in conjunction with one embodiment;

DETAILED DESCRIPTION

Figure 1A:
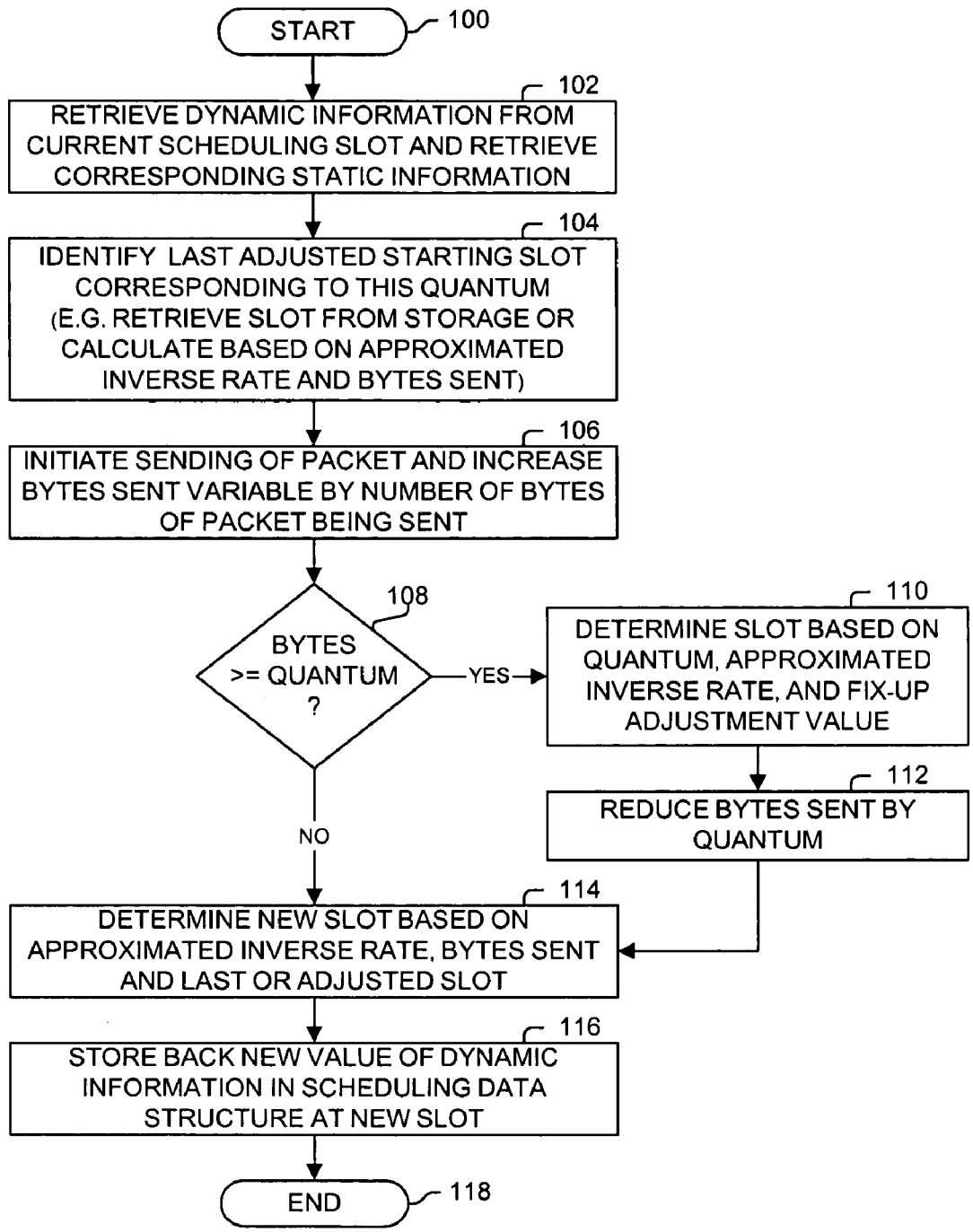
FIG. 1A is a flow diagram illustrating a process for performing rate computations used in one embodiment.

Disclosed are, inter alia, methods, apparatus, data structures, computer-readable medium, mechanisms, and means for performing rate computations, which may be used in most anything that meters the flow at which things happen. As such, these rate computations may be particularly useful in scheduling activities or items, such as, but not limited to packets (especially a series of related packets), processes, threads, traffic flow of any nature, etc.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable medium, mechanisms, and means for performing rate computations, which may be used in most anything that meters the flow at which things happen. As such, these rate computations may be particularly useful in scheduling activities or items, such as, but not limited to packets (especially a series of related packets), processes, threads, traffic flow of any nature, etc.

One embodiment identifies an approximated inverse rate, a fix-up adjustment value, and a quantum. An activity measurement value is maintained based on a measure of activity, and a rate control value is maintained based on the measure of activity and the approximated inverse rate. The fix-up adjustment value is applied once each quantum to the rate control value to maintain rate accuracy of the activity. In one embodiment, the control value is a scheduling value used for determining the relative ordering or timing for performing a next part of the activity (e.g., send one or more packets). Scheduling rates are efficiently and compactly stored in an inverse form, which may have advantages in terms of rate granularity, accuracy, and the ability to deliver service smoothly. In one embodiment, applying the fix-up adjustment value once each quantum to the rate control value includes dithering the rate control value to either round-up or not to round-up the rate control value based on a random number One embodiment associates with a scheduling flow, such as a series of packets, a current slot, a scheduling item corresponding to a packet, and an approximated inverse rate, a fix-up adjustment value, and a quantum value. A last adjusted slot corresponding to the scheduling item is identified. A bytes sent value is adjusted based on a number of bytes of the packet to identify a new bytes sent value. In response to identifying that the bytes sent value is greater than or equal to a quantum value corresponding to the scheduling item: (a) a new last adjusted slot for the scheduling item is identified, which typically includes summing a product of the approximated inverse rate and the quantum value, the fix-up adjustment value, and the last adjusted slot; and (b) a next slot for the scheduling item is determined, which typically includes adding the product of the approximated inverse rate and the new bytes sent value to the new last adjusted slot.

In one embodiment, identifying the last adjusted slot for the scheduling item includes subtracting the product of the approximated inverse rate and the bytes sent value from the current slot. In one embodiment, the fix-up adjustment value is determined based on the error induced by the approximated inverse rate during a quantum corresponding to the scheduling item. In one embodiment, in response to identifying that the bytes sent value is less than a quantum value corresponding to the scheduling item, the next slot is determined, which typically includes adding the product of the approximated inverse rate and the new bytes sent value to the last adjusted slot. In one embodiment, identifying the new last adjusted slot for the scheduling item includes dithering the new last adjusted slot to either round-up or not to round-up the new last adjusted slot based on a random number.

One embodiment uses an approximate inverse rate, requiring fewer bits than a more accurate value of the inverse rate, and periodically adjusts the next slot based on a predetermined fix-up adjustment value such that the next slot varies as it would if there was not the error induced by the use of the approximation of the inverse rate. Thus, instead of relying on a large number of bits to represent the inverse rate and many fractional bits for the current slot, one embodiment uses a byte count to adjust the slot value periodically (e.g., one or more times per quantum) to reduce or eliminate the induced error.

In one embodiment, an interval between adjusted starting slots for consecutive quantums is defined as: interval=quantum*approximated inverse rate+fix-up adjustment value. Accuracy is achieved by ensuring that at least, but typically once for each quantum of bytes sent, the exact same number of desired slots is traversed. Because a floating-point value of the approximated inverse rate may not have the precision to get to the proper point, the fix-up adjustment value is added once per quantum.

FIG. 1A is a flow diagram illustrating a process for performing the rate computations used in one embodiment. Processing begins with process block 100, and proceeds to process block 102, wherein the dynamic scheduling information is retrieved from a current scheduling slot and the corresponding static rate information is retrieved, typically from another data structure.

Figure 1B:
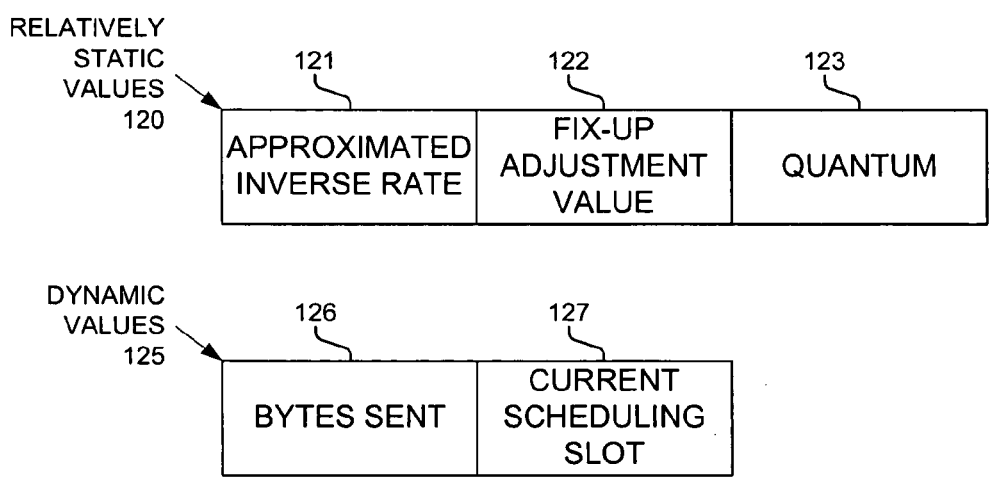
FIG. 1B is a block diagram illustrating stored values used in performing rate computations in one embodiment.

FIG. 1B illustrates stored data items used in one embodiment. A set 120 of relatively static items is retrieved from storage each scheduling cycle in one embodiment, with set 120 including an approximated inverse rate 121, a fix-up adjustment value 122, and the corresponding quantum 123. These items 121-123 are labeled "relatively static values" (also elsewhere just referenced as "static" values or information, etc.) as they are typically defined once for the duration of the metering of the associated packet stream, item series, etc. Thus, during scheduling, a read from memory operation is required without a write operation as data items 121-123 do not change each scheduling cycle. However, in one embodiment, these items are periodically, occasionally or otherwise adjusted (e.g., typically not every scheduling cycle).

In contrast, set 125 of dynamic scheduler specific items used in one embodiment includes values of the bytes sent 126 and the current scheduling slot 127, which are updated each scheduling cycle. One embodiment performs rate computations disclosed herein with a different scheduling mechanism, and in which case, it is possible that set 125 includes no values or a different set of dynamically stored values.

Returning to the processing of FIG. 1A, in process block 104, the last adjusted starting slot corresponding to the current quantum of information being set is identified. In one embodiment, an indication of the last adjusted starting slot is retrieved from memory. While in one embodiment, this last adjusted starting slot is calculated by subtracting the product of the approximated inverse rate and the number of bytes previously sent from the current slot position. Next, in process block 106, one or more corresponding packets are sent and the value of the bytes sent variable is increased accordingly.

As determined in process block 108, if the number of bytes sent for the current quantum equals or exceeds the value of the quantum, then in process block 110, a new last adjusted slot is determined based on the quantum, approximated inverse rate, and the fix-up adjustment value. In one embodiment, the new last adjusted slot is determined by summing the product of the approximated inverse rate and the quantum, the fix-up adjustment value, and the last adjusted starting slot. Of course, this value of the new adjusted starting slot is truncated or adjusted (e.g., wrapped around) as needed to match the slot data structure. In process block 112, the value of the number of bytes sent is reduced by the value of the quantum such that the number of bytes sent is less than the quantum value. Of course, this may be accomplished by truncating the value or by other means (e.g., an overflow indication corresponding to the quantum being equaled or exceeded with the current value of the number of bytes sent being the non-overflowed value, etc.).

In process block 114, the new slot is determined based on the approximated inverse rate, the number of bytes sent since the last adjustment of the starting slot, and the value of the last or adjusted starting slot. In process block 116, the dynamic data (e.g., bytes sent and current slot) is stored back in the scheduling data structure at the new slot position. Processing is complete as indicated by process block 118.

Figure 1C:
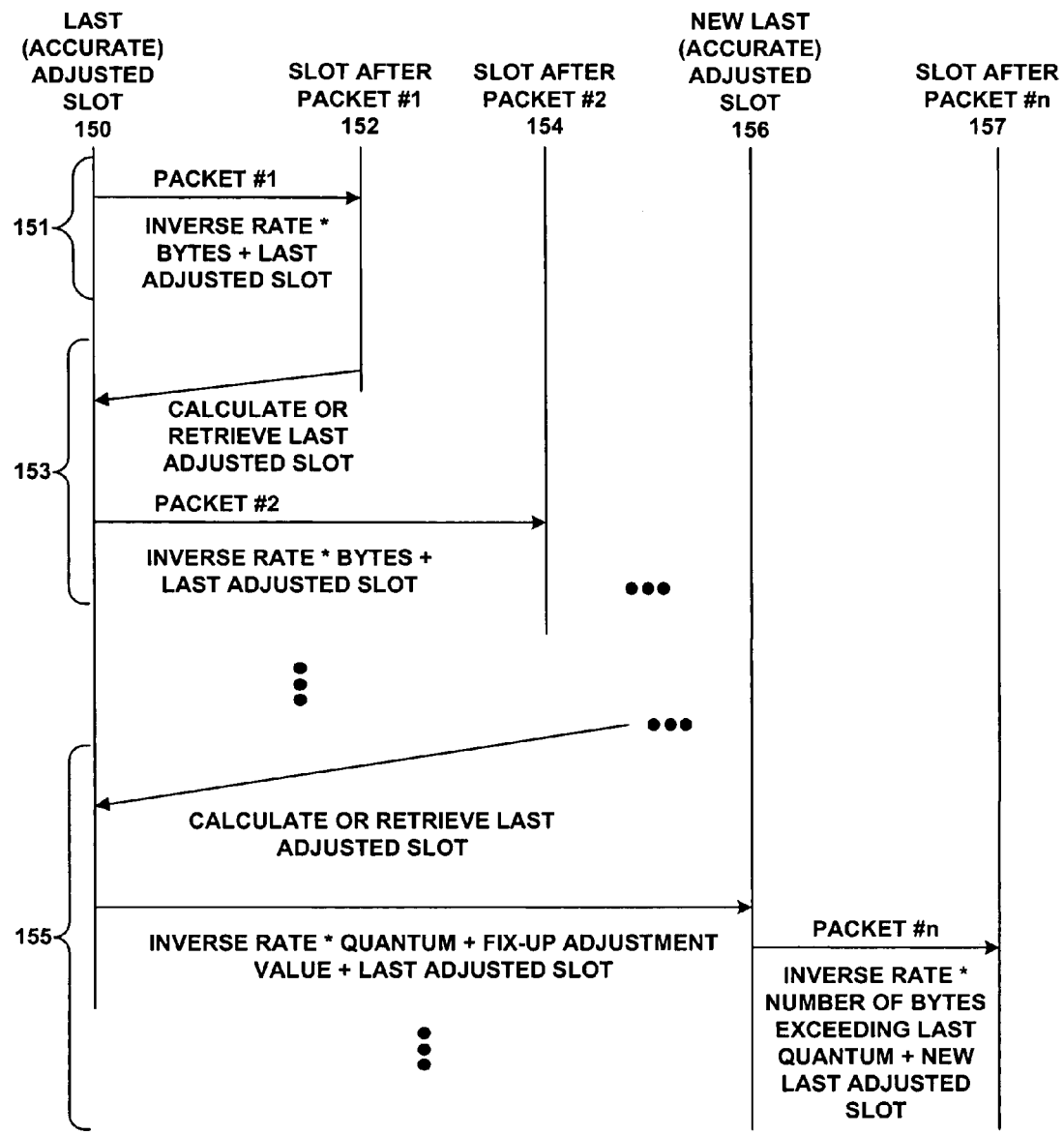
FIG. 1C illustrates the computation of an adjusted slot as performed in one embodiment.

FIG. 1C illustrates the computation of an adjusted slot as performed in one embodiment. One way to view the last adjusted slot is that it is the slot position corresponding to zero bytes of data being sent in the current quantum. Last adjusted slot 150 is shown. During processing 151, a first packet is sent, with a resulting new slot 152 being determined based on the approximated inverse rate, the number of bytes sent, and the last adjusted slot 150. During processing 153, a second packet is sent, with a resulting new slot 154 being determined. Note, last adjusted slot 150 is either retrieved from memory, or typically calculated to save storage space. Then, new slot 154 is determined relative to the calculated position of last adjusted slot 150.

Processing 155 corresponds to the sending of the nth packet in the current quantum with the number of bytes sent exceeding the value of the quantum. The last adjusted slot is typically calculated, with a new last adjusted slot 156 determined relative to last adjusted slot 150 by summing the product of the approximated inverse rate and the quantum, the fix-up adjustment value, and the position of last adjusted slot 150. Slot 157 is then determined relative to new last adjusted slot 156 based on the product of the approximated inverse rate and the number of bytes that exceeded the last quantum.

FIG. 1D illustrates pseudo-code 180 of a process for performing rate computations used in one embodiment. Pseudo-code 180 describes a process similar to that illustrated in FIG. 1A. However, pseudo-code 180 further illustrates, inter alia, that dithering can be used when determining a next adjusted slot value to add additional accuracy.

In one embodiment, the quantum is chosen so that the interval between adjusted starting slots for consecutive quantums (i.e., interval=quantum*approximated inverse rate+fix-up adjustment value) "rounds" to the desired integer value. In one embodiment, dithering is used on the fractional bits of the interval, if any, to take advantage of the extra precision to deliver more accuracy. The dithering approach typically provides the same accuracy whether the interval is large (near the total number of slots) or small (near one). Dithering also improves granularity near the fast end of the range, because the range of rates that can be delivered is determined not just by the quantum, but by the combination of the quantum and the number of bits in the interval.

Dithering can be used to further improve rate-delivery accuracy. The interval can be treated as a non-integer (having more precision), and the fractional part of the interval can be used to adjust the slot by either zero or plus one when re-scheduling, with the adjustment chosen as plus one a percentage of the time based on the fractional part of the interval. Dithering only affects the interval computation, and it does not, for example, increase the number of slots. In one embodiment, the fractional value of the interval does not change over time. As a rounding operation performed on a constant fractional value will always result in the same value, rounding of the fractional value will not produce any increased accuracy. However, using dithering to round up or truncate based on a corresponding probability will produce increased accuracy, without having to maintain the extra fractional bits.

For example, consider a schedule entry that has a reschedule interval of 4.3. A random number (i.e., a true or approximated random number) can be generated between zero and one. This random number can be compared to the fractional value of the interval (i.e., 0.3), with the reschedule interval being rounded-up to the value of five if the random number is less than or equal to (or just less than) 0.3, else truncated to the value of four.

Alternatively, with eight bits of fraction in the interval, 0.3 can be represented as $77/256$ or 0.30078125. A free running, 8-bit random generator can be compared to 77 on every reschedule. With a probability of approximately 0.3, the random number will be less than 77; when this happens, the entry is rescheduled by a rounded-up interval of 5; the rest of the time the entry is rescheduled by a rounded-down interval of 4. This also delivers an average interval of approximately 4.3.

Figure 2:
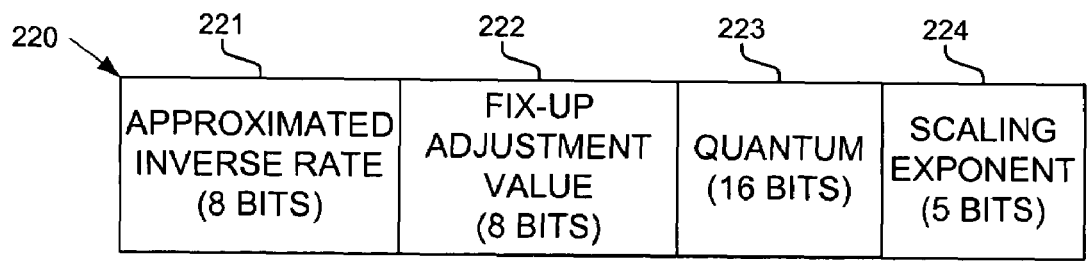
FIG. 2 is a block diagram illustrating stored values used in performing rate computations in one embodiment.

FIG. 2 is a block diagram of items 220 retrieved on which to perform rate calculations in one embodiment. As shown, items 220 include an approximated inverse rate 221, a fix-up adjustment value 222, the corresponding quantum 223, and a scaling exponent 224. Of course, the number of bits used for each field and the scheme used to encode the value stored in each field varies between embodiments.

For example, in one embodiment, the value of approximated inverse rate field 221 stored in an eight bit field ranges from 0-255, while the value used in computations is the stored value divided by two raised to the width of the field (e.g., 8 bits yielding 256) scaled based on scaling exponent 224, such as value representing between $2^0$ and $2^{-15}$ as shown in the examples of encoded rates illustrated in FIG. 3B. While in one embodiment, the value of approximated inverse rate field 221 stored in an eight bit field ranges from 128-255, while the value used in computations is the stored value divided by two raised to the width of the field (e.g., 8 bits yielding 256) scaled by some value, such as between $2^0$ and $2^{-15}$ as shown in the examples of encoded rates illustrated in FIG. 3B. In one embodiment, the value of approximated inverse rate field 221 stored in a seven bit field (thus saving a bit) ranges from 128 and 255, so if a value of less than 128 is to be stored, the value is doubled and scaling exponent 224 is increased by one (i.e., an additional right shift or divide by two to result in the desired value). Due to this scaling, the MSB of the approximated inverse rate is always a '1' and does not have to be stored.

Similarly, the fix-up adjustment value is determined, but its scaling is different than that required for the approximated inverse rate (e.g., varies between $2^6$ to $2^{-7}$ in FIG. 3B) with this relative difference easily determined based on the quantum and the approximated inverse rate. Thus, scaling exponent 224 is also used in one embodiment to also scale fix-up adjustment value 222 to minimizing storage requirements.

When computing the interval, the approximated inverse rate is multiplied by the quantum, giving this product an offset related to the bit position of the MSB of the quantum. If the exponent used with the approximated inverse rate is treated as a number of bits to shift the approximated inverse rate, then the exponent (right shift) used with the interval fix-up value can be computed by the size in bits of the mantissa of the approximated inverse rate minus the bit position of the MSB of the quantum (rounded up to a power of two) used with this rate encoding, plus scaling exponent 224. Note, if this result exceeds a threshold, then it is limited to allow some non-zero fix-up adjustment value to bound the fix-up adjustment value to deliver the desired degree of precision when the interval is close to one.

In one embodiment, a second scaling exponent is used such that approximated inverse rate 221 and fix-up adjustment value 222 are scaled independently. In one embodiment, approximated inverse rate 221, fix-up adjustment value 222, and/or quantum 223 are floating point numbers. In one embodiment, the exponent value used for fix-up adjustment value 222 is offset by a fixed constant from scaling exponent 224 used for approximated inverse rate 221 (or vice versa), but with a floor value (e.g., it can be no smaller than the number of bits in fix-up adjustment value 222 minus one).

Figure 3A:
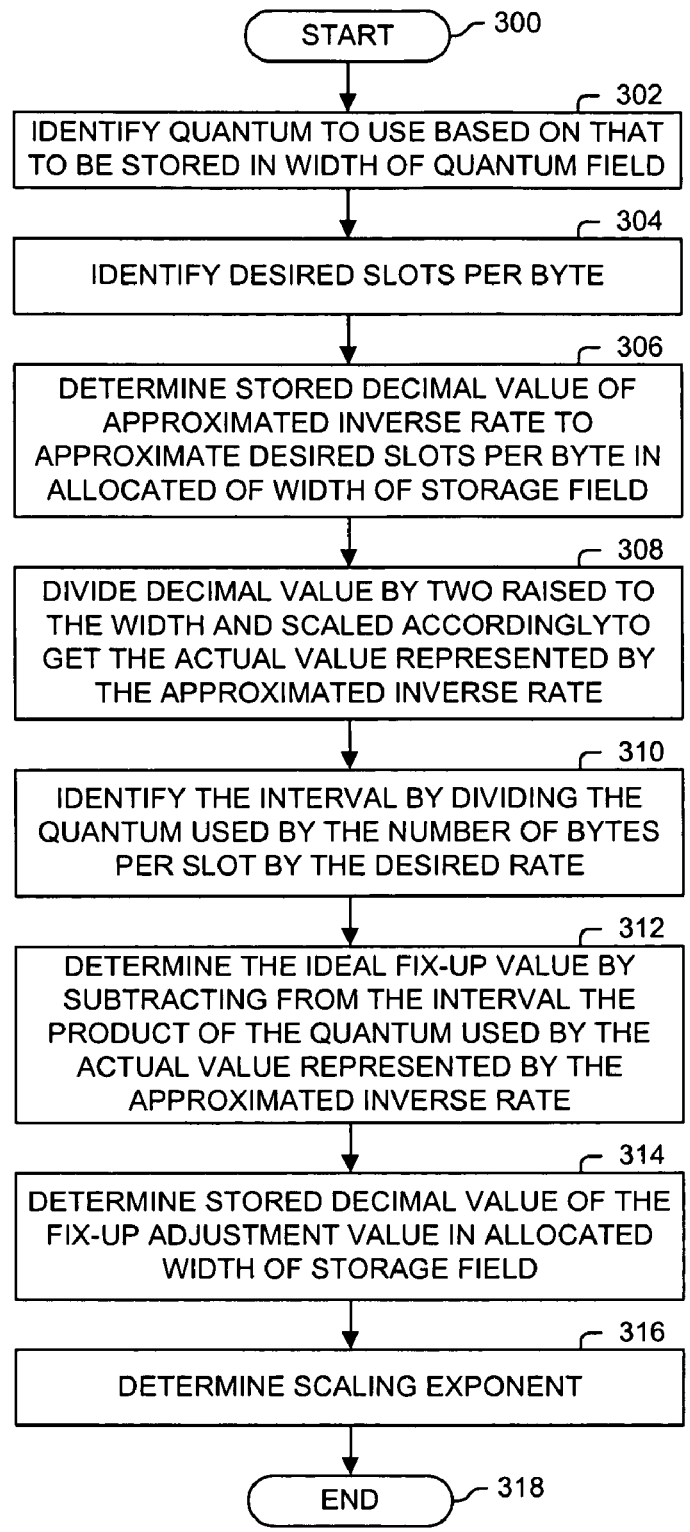
FIG. 3A is a flow diagram illustrating a process for determining an approximated inverse rate, a fix-up adjustment value, and a quantum value used in one embodiment.

FIG. 3A is a flow diagram illustrating a process for determining an approximated inverse rate, a fix-up adjustment value, and a quantum value used in one embodiment. Processing begins with process block 300, and proceeds to process block 302, wherein the quantum to use is determined based on the width of the quantum field provided. In process block 304, the desired number of slots per byte is determined. In process block 306, the stored decimal value of the approximated inverse rate is determined such that it approximates the desired slots per byte in the number of storage bits provided for the approximated inverse rate. In process block 308, the decimal value of the approximated inverse rate is divided by two raised to the number of storage bits and scaled to get the approximated inverse rate. In process block 310, the interval is determined by dividing the quantum used by the number of bytes per slot and then by the desired rate. In process block 312, the ideal fix-up adjustment value is determined by subtracting from the interval the product of the quantum used by the actual value represented by the approximated inverse rate. In process block 314, the stored decimal value of the fix-up adjustment value is determined to be stored in the allocated storage field; and in process block 316, the scaling exponent to use is determined. Processing is complete as indicated by process block 318.

Note, there are an unlimited number of methods of determining the approximated inverse rate used in a particular embodiment, and the method used might vary for different items within the same scheduler. In one embodiment, for example, extra error is purposefully included in the inverse rate and/or quantum value, with, the fix-up adjustment value compensating for such induced error once each quantum. Also, in one embodiment, a fix-up adjustment value is applied two or more times each quantum, and in one embodiment, the multiple fix-up values applied for a quantum might be different values. In one embodiment, the fix-up adjustment value is applied once each quantum with a second fix-up adjustment value being applied every nth quantum to provide additional accuracy In one embodiment, there may be more than two levels of fix-up adjustments applied. These examples illustrate just a few of an unlimited number of such possible variations used in one embodiment in keeping within the scope and spirit of the invention.

FIG. 3B illustrates an exemplary resultant set of approximated inverse rates, fix-up adjustment values, and a quantum values for various target rates used in conjunction with one embodiment. As shown, a 10 KB MTU and 8192 slots are used.

Figure 4A:
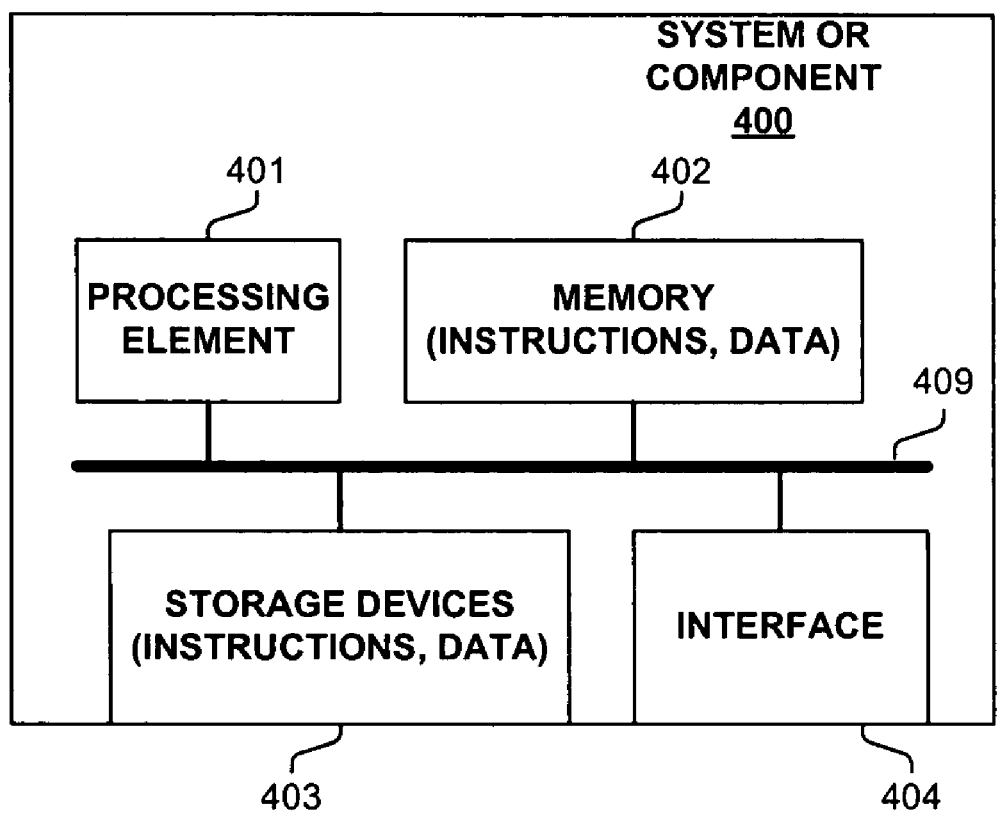
FIG. 4A is a block diagram of a system to perform the rate computations and/or determination of approximated inverse rates, fix-up adjustment values, and a quantum values used in one embodiment.

FIG. 4A is a block diagram of a system to perform the rate computations and/or determination of approximated inverse rates, fix-up adjustment values, and a quantum values used in one embodiment. In one embodiment, system or component 400 performs one or more processes corresponding to one of the flow diagrams illustrated or otherwise described herein.

In one embodiment, component 400 includes a processing element 401, memory 402, storage devices 403, and an interface 404 for sending and receiving packets, items, and/or other information, which are typically coupled via one or more communications mechanisms 409 (shown as a bus for illustrative purposes.) Various embodiments of component 400 may include more or less elements. The operation of component 400 is typically controlled by processing element 401 using memory 402 and storage devices 403 to perform one or more tasks or processes. Memory 402 is one type of computer-readable medium, and typically comprises random access memory (RAM), read only memory (ROM), flash memory, integrated circuits, and/or other memory components. Memory 402 typically stores computer-executable instructions to be executed by processing element 401 and/or data which is manipulated by processing element 401 for implementing functionality in accordance with an embodiment. Storage devices 403 are another type of computer-readable medium, and typically comprise solid state storage media, disk drives, diskettes, networked services, tape drives, and other storage devices. Storage devices 403 typically store computer-executable instructions to be executed by processing element 401 and/or data which is manipulated by processing element 401 for implementing functionality in accordance with an embodiment.

Figure 4B:
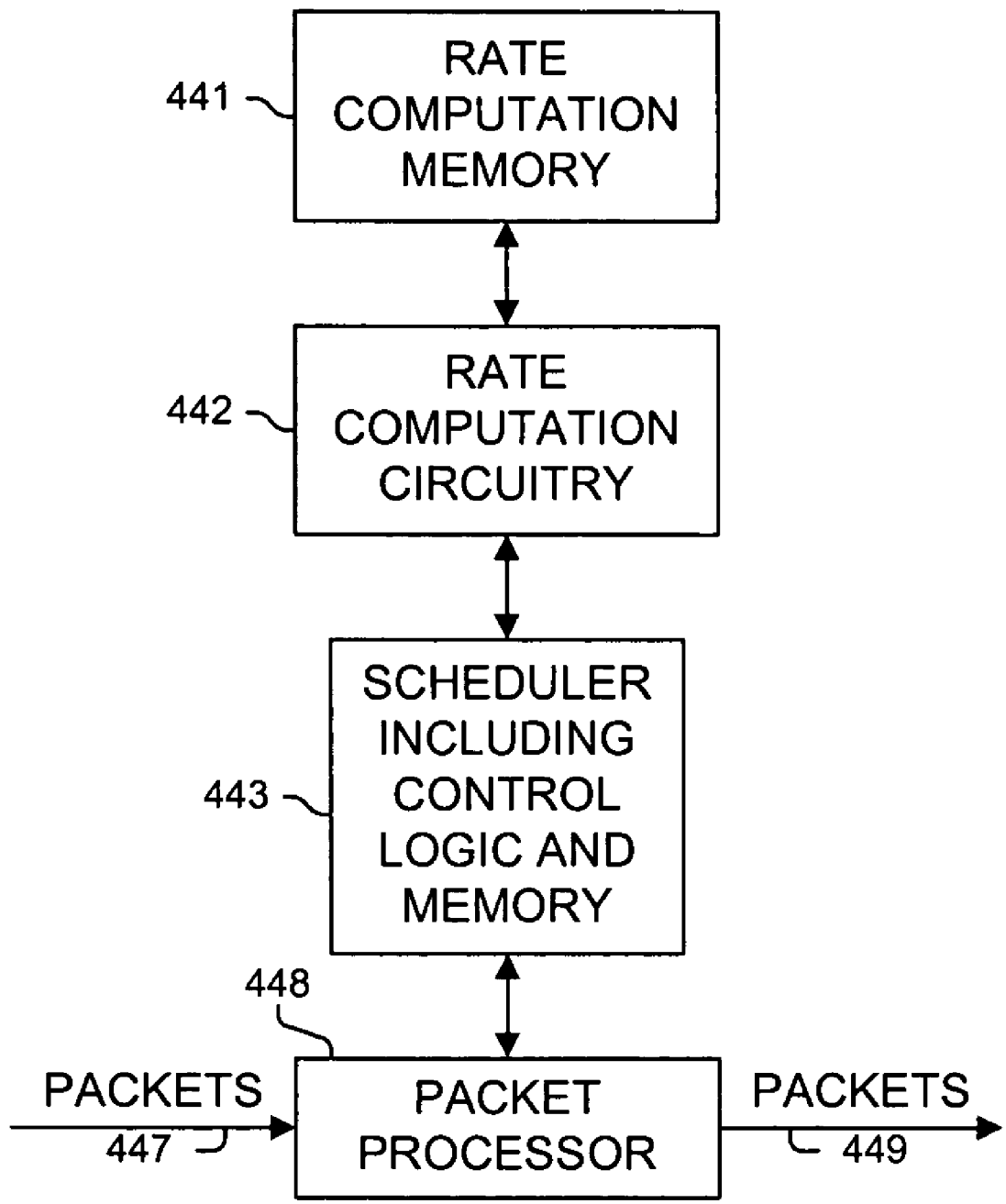
FIG. 4B is a block diagram of a system to perform the rate computations used in one embodiment.

FIG. 4B is a block diagram of a system to perform the rate computations used in one embodiment. As shown, packets 447 are received and processed by packet processor 448 to result in packets 449. The processing of these packets 447 is performed in response to scheduler 443, which typically includes its own control logic and memory. In one embodiment, rate computation circuitry (and/or processing element) 442 stores values (e.g., those illustrated in FIG. 1B or 2) in rate computation memory 441. One skilled in the art would readily know how to implement in hardware the rate computations described herein, and especially those illustrated in FIGS. 1A and 1D, whether using a processor or typically combinatorial logic.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for use in rate controlling an activity, the method comprising:
    identifying an approximated inverse rate of a desired rate, a fix-up adjustment value, and a quantum;
    maintaining an activity measurement value based on a measure of activity;
    maintaining a rate control value based on the activity measurement value and the approximated inverse rate;
    applying the fix-up adjustment value once each said quantum to the rate control value to maintain rate accuracy of the activity;
    wherein the fix-up adjustment value is a predetermined value for correcting a deviation from the desired rate based on a lack of precision error induced by said use of the approximated inverse rate in maintaining the rate control value; wherein the activity includes sending packets of a stream of packets; and wherein the rate control value is a scheduling value used for determining the relative ordering or timing of a next one or more packets of the stream of packets.

2. The method of claim 1, wherein the activity measurement value is a number of bytes or packets sent.

3. The method of claim 1, wherein said applying the fix-up adjustment value once each quantum to the rate control value includes dithering the rate control value to either round-up or not to round-up the rate control value based on a random number.

4. A storage device storing computer-executable instructions to perform steps for rate controlling an activity, said steps comprising:
    identifying an approximated inverse rate, a fix-up adjustment value, and a quantum;
    maintaining an activity measurement value based on a measure of activity;
    maintaining a rate control value based on the activity measurement value and the approximated inverse rate;

applying the fix-up adjustment value once each said quantum to the rate control value to maintain rate accuracy of the activity;

wherein the fix-up adjustment value is a predetermined value for correcting a deviation from the desired rate based on a lack of precision error induced by said use of the approximated inverse rate in maintaining the rate control value; wherein the activity includes sending packets of a stream of packets; and wherein the rate control value is a scheduling value used for determining the relative ordering or timing of a next one or more packets of the stream of packets.

5. The storage device of claim 4, wherein the activity measurement value is a number of bytes or packets sent.

6. The storage device of claim 4, wherein said applying the fix-up adjustment value once each quantum to the rate control value includes dithering the rate control value to either round-up or not to round-up the rate control value based on a random number.

7. An apparatus for use in rate controlling an activity, the apparatus comprising:

means for identifying an approximated inverse rate, a fix-up adjustment value, and a quantum;

means for maintaining an activity measurement value based on a measure of activity;

means for maintaining a rate control value based on the activity measurement value and the approximated inverse rate;

means for applying the fix-up adjustment value once each said quantum to the rate control value to maintain rate accuracy of the activity;

wherein the fix-up adjustment value is a predetermined value for correcting a deviation from the desired rate based on a lack of precision error induced by said use of the approximated inverse rate in maintaining the rate control value; wherein the activity includes sending packets of a stream of packets; and wherein the rate control value is a scheduling value used for determining the relative ordering or timing of a next one or more packets of the stream of packets.

8. The apparatus of claim 7, wherein the activity measurement value is a number of bytes or packets sent.

9. The apparatus of claim 7, wherein said means for applying the fix-up adjustment value once each quantum to the rate control value includes: means for dithering the rate control value to either round-up or not to round-up the rate control value based on a random number.

10. A method for use in scheduling packets, the method comprising:

identifying in a current slot a scheduling item corresponding to a packet;

identifying an approximated inverse rate of a desired rate, a fix-up adjustment value, and a quantum value corresponding to the scheduling item;

identifying a last adjusted slot for the scheduling item;

adjusting a bytes sent value based on a number of bytes of the packet to identify a new bytes sent value; and in response to identifying that the bytes sent value is greater than or equal to a quantum value corresponding to the scheduling item: (a) identifying a new last adjusted slot for the scheduling item, said identifying the new last adjusted slot including summing a product of the approximated inverse rate and the quantum value, the fix-up adjustment value, and the last adjusted slot; and (b) determining a next slot for the scheduling item, said determining the next slot including adding the product of the approximated inverse rate and the new bytes sent value to the new last adjusted slot;

wherein the fix-up adjustment value is a predetermined value for correcting a deviation from the desired rate based on a lack of precision error induced by said use of the approximated inverse rate in said scheduling of packets.

11. The method of claim 10, wherein said identifying the last adjusted slot for the scheduling item includes subtracting the product of the approximated inverse rate and the bytes sent value from the current slot.

12. The method of claim 10, wherein the fix-up adjustment value is determined based on the error induced by the approximated inverse rate during a quantum corresponding to the scheduling item.

13. The method of claim 10, comprising: in response to identifying that the bytes sent value is less than a quantum value corresponding to the scheduling item, determining the next slot including adding the product of the approximated inverse rate and the new bytes sent value to the last adjusted slot.

14. The method of claim 10, wherein said identifying the new last adjusted slot for the scheduling item includes dithering the new last adjusted slot to either round-up or not to round-up the new last adjusted slot based on a random number.

15. An apparatus for use in scheduling packets, the apparatus comprising:

means for identifying in a current slot a scheduling item corresponding to a packet;

means for identifying an approximated inverse rate of a desired rate, a fix-up adjustment value, and a quantum value corresponding to the scheduling item;

means for identifying a last adjusted slot for the scheduling item;

means for adjusting a bytes sent value based on a number of bytes of the packet to identify a new bytes sent value; and means for in response to identifying that the bytes sent value is greater than or equal to a quantum value corresponding to the scheduling item: (a) identifying a new last adjusted slot for the scheduling item, said identifying the new last adjusted slot including summing a product of the approximated inverse rate and the quantum value, the fix-up adjustment value, and the last adjusted slot; and (b) determining a next slot for the scheduling item, said determining the next slot including adding the product of the approximated inverse rate and the new bytes sent value to the new last adjusted slot;

wherein the fix-up adjustment value is a predetermined value for correcting a deviation from the desired rate based on a lack of precision error induced by said use of the approximated inverse rate in said scheduling of packets.

16. The apparatus of claim 15, wherein said means for identifying the last adjusted slot for the scheduling item includes means for subtracting the product of the approximated inverse rate and the bytes sent value from the current slot.

17. The apparatus of claim 15, wherein the fix-up adjustment value is determined based on the error induced by the approximated inverse rate during a quantum corresponding to the scheduling item.

18. The apparatus of claim 15, comprising: means for in response to identifying that the bytes sent value is less than a quantum value corresponding to the scheduling item, determining the next slot, which includes adding the product of the approximated inverse rate and the new bytes sent value to the last adjusted slot.

19. The apparatus of claim 15, comprising: means for computing the approximated inverse rate and the fix-up adjustment value.

20. The apparatus of claim 15, wherein said identifying the new last adjusted slot for the scheduling item includes dithering the new last adjusted slot to either round-up or not to round-up the new last adjusted slot based on a random number.

21. A storage device storing computer-executable instructions to perform steps for use in scheduling packets, said steps comprising:

identifying in a current slot a scheduling item corresponding to a packet;

identifying an approximated inverse rate of a desired rate, a fix-up adjustment value, and a quantum value corresponding to the scheduling item;

identifying a last adjusted slot for the scheduling item;

adjusting a bytes sent value based on a number of bytes of the packet to identify a new bytes sent value; and in response to identifying that the bytes sent value is greater than or equal to a quantum value corresponding to the scheduling item: (a) identifying a new last adjusted slot for the scheduling item, said identifying the new last adjusted slot including summing a product of the approximated inverse rate and the quantum value, the fix-up adjustment value, and the last adjusted slot; and (b) determining a next slot for the scheduling item, said determining the next slot including adding the product of the approximated inverse rate and the new bytes sent value to the new last adjusted slot;

wherein the fix-up adjustment value is a predetermined value for correcting a deviation from the desired rate based on a lack of precision error induced by said use of the approximated inverse rate in said scheduling of packets.

22. The storage device of claim 21, wherein said identifying the last adjusted slot for the scheduling item includes subtracting the product of the approximated inverse rate and the bytes sent value from the current slot.

23. The storage device of claim 21, wherein the fix-up adjustment value is determined based on the error induced by the approximated inverse rate during a quantum corresponding to the scheduling item.

24. The storage device claim 21, comprising: in response to identifying that the bytes sent value is less than a quantum value corresponding to the scheduling item, determining the next slot including adding the product of the approximated inverse rate and the new bytes sent value to the last adjusted slot.

25. The storage device claim 21, wherein said identifying the new last adjusted slot for the scheduling item includes dithering the new last adjusted slot to either round-up or not to round-up the new last adjusted slot based on a random number.

* * * * *